July 15, 1924.

C. VITEK 1,501,636

ELECTRICAL GROUND CONNECTION CLAMP

Filed Aug. 11, 1921

INVENTOR
Charles Vitek
BY
Frank Schraeder Jr
Attorney

Patented July 15, 1924.

1,501,636

UNITED STATES PATENT OFFICE.

CHARLES VITEK, OF MAYWOOD, ILLINOIS, ASSIGNOR, BY MESNE ASSIGNMENTS, TO BENJAMIN A. TETZLAFF, OF GREEN BAY, WISCONSIN.

ELECTRICAL GROUND-CONNECTION CLAMP.

Application filed August 11, 1921. Serial No. 491,632.

*To all whom it may concern:*

Be it known that I, CHARLES VITEK, a citizen of the Republic of Czechoslovakia, residing at Maywood, in the county of Cook and State of Illinois, have invented a new and useful Improvement in Electrical Ground-Connection Clamps, of which the following is a specification.

The invention relates to electrical connections and more particularly to ground connections.

It is an object of the invention to provide means for securely and reliably establishing a ground connection for an electric conductor.

A further object aims at providing a clamp adapted to screw to a grounding element and having means for maintaining contact between the element and a cable shoe.

It still further constitutes the provision of a connection which can be manufactured at small expense and which may be conveniently manipulated to establish the desired connection or disrupt the same.

With these and other objects in view which will readily appear as the description of the invention proceeds, the latter comprises a means particularly described in the specification and pointed out in the claims forming a part thereof, and illustrated in the drawing in which, Figure 1 is a side view of the electrical connection with the grounding element shown in dotted lines.

Figures 1, 2, 3:
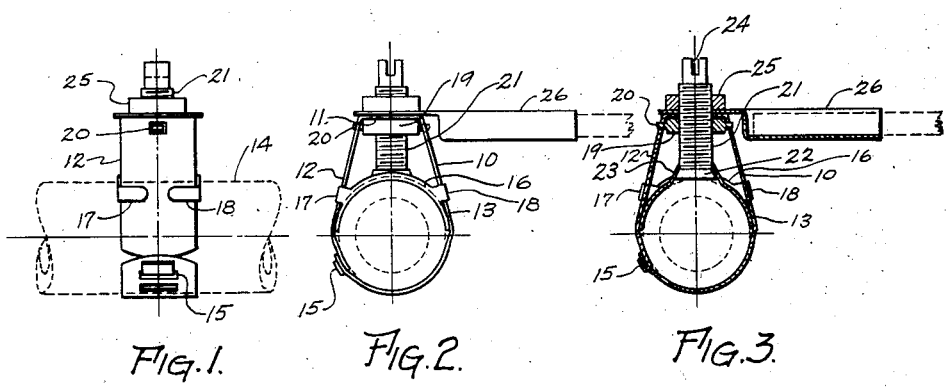
Figure 2 is a front view of the parts shown in Figure 1.
Figure 3 is a sectional view.

The clamp 10 comprises a flexible strip of metal which intermediate its ends is formed with a straight portion 11 and thence passes into legs 12, and 13 which are adapted to encompass a grounding element 14, shown in dotted lines in Figure 1. The ends of the legs 12, 13 may be interconnected by a common slot connection, as appears at 15. Between the legs 12 and 13 a bridge member 16 is interposed, which is of arcuate shape to fit the arcs of the tubular grounding element 14 of various diameters. As shown, the bridge member 16 is formed with arms 17, 18 which are bent back to overlap the legs 12 and 13. A nut 19 engages with the under side of the straight portion 11 of the flexible strip and is secured against rotation by lugs 20 which extend through apertures provided in the flexible strip. The nut 19 is traversed by a screw 21 which at the lower end is formed with a circular head 22 received within a socket 23 provided on the bridge 16. The upper end of the screw is formed with a central slot 24 for the insertion of a screw driver or similar implement for the rotation of the screw.

From the foregoing, it follows that upon rotation of the screw 24 in view of the fixed arrangement of the nut 19, a longitudinal movement is imparted to the screw and thereby to the bridge member 22 which causes the legs 12, 13 either to be spread or to be approached in accordance with the direction of rotation of the screw 21, whereby the member 14 is either released or engaged by frictional contact.

As indicated, a nut 25 is arranged at the upper end of the screw 21, and between the straight portion 11 of the strip and the nut 25, the apertured end of a cable shoe 26 is interposed so that a formal connection may be established for the cable shoe and the clamp.

It is obvious that the ground connection may be conveniently and rapidly established by tightening the clamp on the grounding member 14, whereupon the cable shoe may be secured on the screw 21 by rotation of the nut 25.

The drawing discloses a preferred embodiment of the invention. Various changes of construction and design may be resorted to, and I therefore wish to include all alterations, modifications and changes constituting departures within the scope of the invention, as defined by the appended claims.

1. An electrical connection comprising a pair of flexible legs embracing a grounding element, means for connecting the free ends of said legs, an integral portion firmly uniting the opposite ends of said legs, a stationary nut interposed between said legs adjacent the integral portion, a screw coacting with said nut, a bridge coacting with said screw for forcing the flexible legs firmly in engagement with said grounding element, arms supported by said bridge for preventing the spreading of the flexible leg portions and said bridge, a cable shoe and means for securing said cable shoe to said legs.

2. An electrical connection comprising a pair of flexible legs encompassing a grounding element, means for connecting the free ends of said legs, an integral portion uniting the other ends of said legs, a bridge between the grounding element and said integral portion, a stationary nut, means supported by said bridge for preventing spreading of said legs, said bridge having a raised portion, a screw extending through said raised portion and said integral portion for tightening the legs around the grounding element, a cable shoe and means for clamping said cable shoe to the upper face of said integral portion.

In witness whereof, I have hereunto subscribed my name this 2nd day of August, 1921.

CHARLES VITEK.